United States Patent [19]

Dorsey-Palmateer

[11] Patent Number: 5,506,641
[45] Date of Patent: Apr. 9, 1996

[54] APPARATUS FOR CONTROLLING PROJECTION OF OPTICAL LAYUP TEMPLATE

[75] Inventor: John W. Dorsey-Palmateer, Gig Harbor, Wash.

[73] Assignee: The Boeing Company, Seattle, Wash.

[21] Appl. No.: 438,225

[22] Filed: May 9, 1995

Related U.S. Application Data

[63] Continuation of Ser. No. 210,859, Mar. 18, 1994, Pat. No. 5,444,505, which is a continuation of Ser. No. 951,603, Sep. 28, 1992, Pat. No. 5,341,183.

[51] Int. Cl.⁶ .................................................. G03B 21/00
[52] U.S. Cl. .............................. 353/28; 353/122; 356/376
[58] Field of Search ......................... 353/28, 11, 121, 353/122; 356/386, 387.38 C, 376, 375; 364/474.28, 474.29, 474.36, 474.08

[56] References Cited

U.S. PATENT DOCUMENTS

| | | | |
|---|---|---|---|
| 4,704,020 | 11/1987 | Murakami et al. | 353/122 |
| 4,739,487 | 4/1988 | Bonnet et al. | 364/475 |
| 4,889,425 | 12/1989 | Edwards et al. | 33/286 |
| 4,957,369 | 9/1990 | Antonsson | 356/376 |
| 5,007,175 | 4/1991 | Schwarz | 33/286 |
| 5,237,384 | 8/1993 | Fukunaga et al. | 356/376 |
| 5,430,662 | 7/1995 | Ahonen | 353/28 |

*Primary Examiner*—William C. Dowling
*Attorney, Agent, or Firm*—Conrad O. Gardner

[57] ABSTRACT

A projection system having a process utilizing three-dimensional data, thereby allowing the system to account for rotational and translational differences between the projector and the object upon which the laser light is directed. Reference sensors located on the object are in a known relationship to the three-dimensional data set to be projected, i.e., the reference sensors utilize the same coordinate system as the three-dimensional data set.

2 Claims, 2 Drawing Sheets

APPARATUS FOR CONTROLLING PROJECTION OF OPTICAL LAYUP TEMPLATE

RELATED APPLICATIONS

This is a continuation application based upon U.S. patent application Ser. No. 08/210,859, filed Mar. 18, 1994, now U.S. Pat. No. 5,444,505 which was a continuation application based upon U.S. patent application Ser. No. 07/951,603, filed Sep. 28, 1992, now U.S. Pat. No. 5,341,183.

BACKGROUND OF THE INVENTION

1. Field of the Invention

This invention relates to a rapidly scanned laser system that accurately identifies locations on an object, and more particularly, to a rapidly scanning laser system utilizing a three-dimensional (3-D) data set projected onto contoured surfaces.

2. Discussion of the Prior Art

U.S. Pat. No. 4,883,352 is directed to a galvanometer that scans flat patterns. U.S. Pat. No. 4,883,352 teaches that in critical applications, fine focus control can be accomplished via changes of laser wavelength. The device shown uses quadrant photodetector to actively compensate for relative lateral motion between the scanners and the site being scanned.

The present optical layup template (OLT) can be distinguished by noting that while galvanometer scanning is known, it is the improvements on that type of system which are of significance. The OLT does not use wavelength to control the focusing. It has a fixed focus and fixed wavelength laser. The quadrant photodetector for U.S. Pat. No. 4,883,352 is only designed to compensate for lateral movement. The OLT has at least three (and preferably six) quadrant detectors which will allow for compensation of lateral, depth, and rotational (pitch, yaw, and roll) motions. It is also apparent that the U.S. Pat. No. 4,883,352 system is also optimally designed for projection onto a flat or effectively flat (as seen by the galvanometer scanner) objects. The OLT, in contrast, is designed to project onto highly contoured parts, based upon information from a 3-D model of the projection pattern.

U.S. Pat. No. 4,818,098 relates to a projection system for flat pattern to flat pattern projection. It uses multiple image position sensors for determining planar rotational and translational shifts. (See column 7, lines 20, et seq.) The summary also mentions the use of graphics processor with means to receive a variety of graphics inputs form external sources and a vector generator to provide the desired scan positions for the servos (column 8, lines 20, et seq.).

The present OLT, in contrast, is designed to project 3-D images on contoured surfaces, rather than flat surfaces, as taught in U.S. Pat. No. 4,818,098. Planar projections are merely a degenerate condition for the OLT. The present OLT has quadrant detector input to detect any relative movement of the projection object with respect to the projector, and is designed to correct for these rotations and translations. The multiple sensors in U.S. Pat. No. 4,818,098 are clearly designed to compensate only for planar rotations and transitions.

It is also apparent that the use of the graphics interface by U.S. Pat. No. 4,818,098 is designed to generate a flat pattern from another data set. Again, the present OLT can be contrasted in that it does not generate an intermediate flat pattern in order to determine the commands that are sent to the galvanometers. The advantage of the present system is that distortions which can be generated by applying 3-dimensional rotations to flat pattern algorithms can be totally avoided.

SUMMARY OF THE INVENTION

This invention relates to a rapidly scanning laser system that utilizes 3-D data sets and accurately identifies locations on an object. The rapidly scanning laser system is a laser spot which moves from location to location with sufficient speed to appear as a continuous line. This rapidly scanning laser is used for locating plies of material in the hand layup of composite parts and locating templates or paint masks during the painting of aircraft. The present system comprises a controller, a laser projector, and a data set defining the pattern to be projected. Reference locations on the object have the same coordinate system as the 3-D data set of the projected image, These reference locations can be fitted with active sensors (quadrant detectors) or preferrably cooperative targets which return the laser light back to the laser projector for detection, thus allowing the system to account for rotational and translational differences between the projector and object being projected upon. An algorithm is used to calculate the position and orientation of the projector relative to the reference sensors. Given the 3-D data set and the computed position of the projector, the pointing system, including orthogonal galvanometer pair with shaft mounted mirrors, corresponding to each point of the 3-D data set are calculated, and the projector is then sequentially pointed to each of the calculated positions. Various interpolation schemes smooth the motion of said galvonometers pair and reduce the following error of the control system. Information on ply material and orientation can also be projected. Key features of the present system include: numerical algorithms that control the manner in which the 3-D set is projected onto contoured surfaces and also compute the position of the laser projector relative to the projection surface. Technology for determining the positions of the reference locations which include active targets (quadrant detectors) on or adjacent to the projection surface, or cooperative targets on or adjacent to the projector surface, which return the laser light back to the laser projector by various schemes, thus allowing the streamlined calculation to occur.

DETAILED DESCRIPTION OF THE PREFERRED EMBODIMENT

This invention relates to a rapidly scanned laser system that accurately identifies locations on an object. (Rapidly scanned means a scanned laser spot which moves from location to location with sufficient speed to appear as a continuous line.) Two exemplary applications for this device are:

1. locating plies of material in the hand layup of composite parts.

2. locating templates or paint masks during the painting of an aircraft.

Another for a slowly scanned system is in identifying locations on an aircraft during assembly, e.g., locating stringer clips and shear ties on an aircraft during final assembly. (Slowly scanned means a stationary pointer which can be moved incrementally from point to point.)

Prior high speed scanning of laser light for the purpose of precision location of features has not been satisfactory in precision applications for many reasons, most notably:

Prior users have utilized algorithms requiring flat pattern projection as opposed to directly projecting three-dimensional (3-D) data. A requirement is that 3-D data first be converted into a flat pattern by assuming system constraints such as projector position and orientation; and second, introduction of a projection plane on which the flat pattern is generated. Thus, the flat pattern can only be accurately projected from one position. In a realistic environment, it is necessary to simplify and account for changes in an object's location and orientation with respect to the laser projector. This is necessary to simplify the initial alignment and subsequent adjustments for relative movement between the projector and target object. Algorithms which scale, skew, translate, and rotate flat patterns will not accommodate this requirement. A prior attempt was the installation of a translation stage in the projector head so that for a given application, the projector system will allegedly be self-correcting. This will not provide a functional projection system because translations alone will not correct for rotations which will occur.

Figure 1:
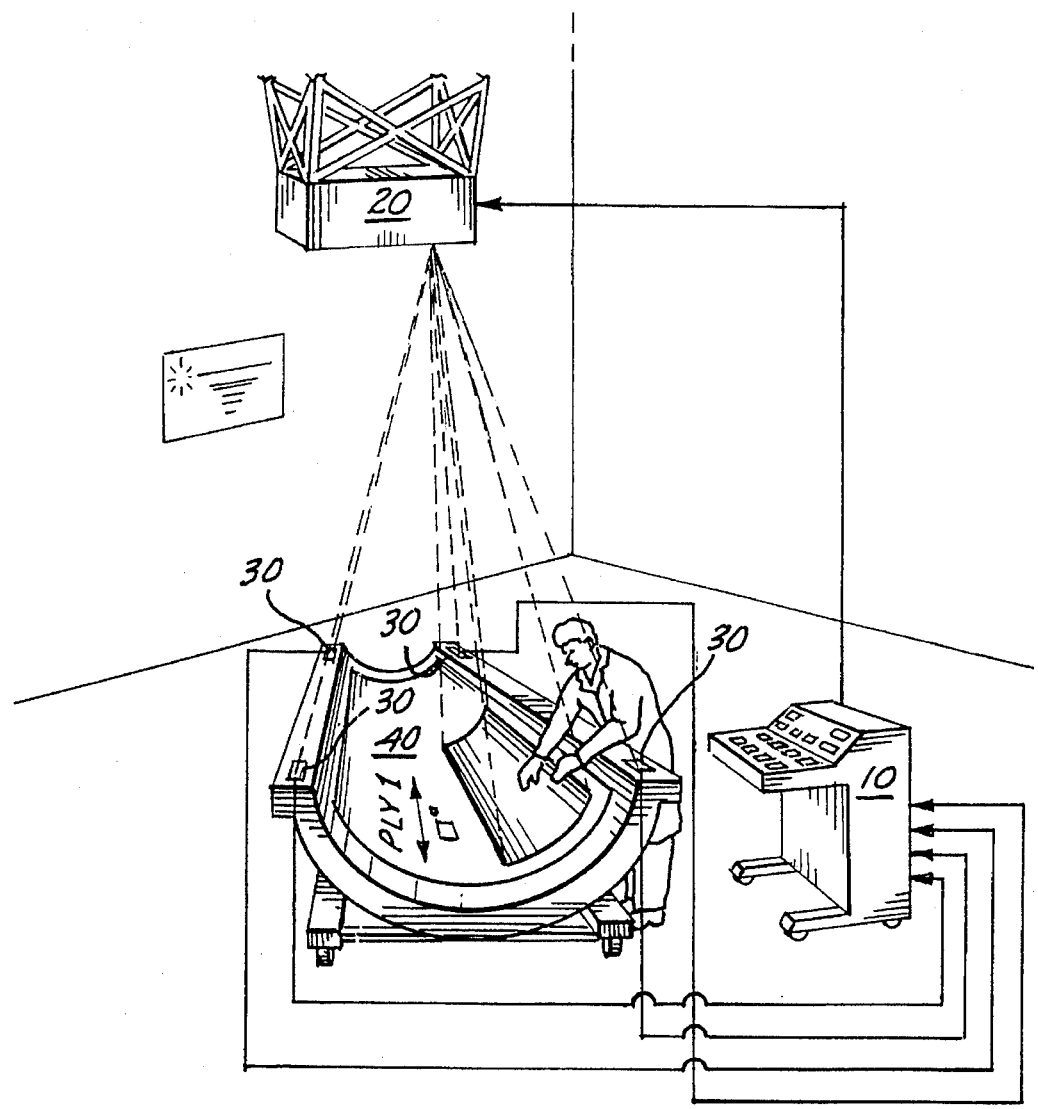
FIG. 1 is a perspective view of the present laser projection system showing an exemplary reference sensor system; and, FIG. 2 is a block diagram partially in circuit schematic of a reference sensor system coupled downstream from the reference sensors shown in FIG. 1.

A laser projector comprises three major components, as shown in FIG. 1; and includes:

1. controller 10 (i.e., operator interface and projector driver);

2. a laser projector 20, having the data set defining the pattern to project; and, 3. reference sensors 30 positioned on the object 40;

4. their arrangement return and data set (controller) system.

This invention addresses inadequacies in projection systems via a process which is specifically designed to directly use 3-D data, and which will allow the system to account for rotational and translational differences between projector 20 on object 40 on which the laser light is pointed. In order to do this, however, it is necessary to have reference sensors 30 on object 40 that the laser light is pointed. Sensors 30 must be in a known relationship to the 3-D data set to be projected, i.e., reference sensors 30 should use the same coordinate system as the 3-D data set. FIG. 1 also shows target object 40 where the 3-D data set lays (in this figure a layup mandrel) and reference sensors 30 mounted on target object 40.

An abbreviated summary of the process includes the following steps:

1. Reference sensors 30 positions are measured (illuminated) with projector 20. The horizontal and vertical angles of the two scanners, including measuring the voltage to a pair of orthogonal galvanometers with shaft mounted mirrors, are recorded.

2. A computer algorithm is used to calculate the position and orientation of projector 20 relative to sensors 30:

COMPUTER ALGORITHM $$\frac{CH\,A - CH\,C}{CH\,A + CH\,C} = \text{"Horizontal" Position Measurement}$$

$$\frac{CH\,B - CH\,D}{CH\,B + CH\,D} = \text{"Vertical" Position Measurement}$$

3. Given the 3-D data set and the computed position of projector 20, the horizontal and vertical angles from the pair of orthogonal galvanometers for each point of the 3-D data set are calculated.

4. Projector 20 is sequentially pointed to each of the calculated positions. Information on ply material and orientation can also be projected.

5. Periodically, reference sensors 30 positions are measured again to ascertain if there has been relative movement between them and projector 20. If movement is detected, steps 2, et seq., are executed again.

A key feature of the process is the numerical algorithm utilized in steps 2 and 3 infra. The equation solved is:

$$\tan(H) = \frac{m_{11}(X-x) + m_{12}(Y-y) + m_{13}(Z-z)}{m_{31}(X-x) + m_{32}(Y-y) + m_{33}(Z-z)}$$

$$\frac{\tan(V)}{\cos(H)} = \frac{m_{21}(X-x) + m_{22}(Y-y) + m_{23}(Z-z)}{m_{31}(X-x) + m_{32}(Y-y) + m_{33}(Z-z)}$$

where:

H AND V=horizontal and vertical angles projected.

X, Y, and Z=the position of projector 20.

Omega, Phi, and Kappa=the angular orientation of projector 20.

x, y, and z=the position of locations to be projected.

$m_{ij}$=the angle cosines for the orientation of projector 20.

$m_{11}$=cos(Phi) cos(Kappa)

$m_{12}$=sin(Omega) sin(Phi) cos(Kappa)+cos(Omega) sin(Kappa)

$m_{13}$=cos(Omega) sin(Kappa) cos(Kappa)+sin(Omega) sin(Kappa)

$m_{21}$=cos(Phi) sin(Kappa)

$m_{22}$=sin(Omega) sin(Phi) sin(Kappa)+sin(Omega) cos(Kappa)

$m_{23}$=cos(Omega) sin(Phi) sin(Kappa)+sin(Omega) cos(Kappa)

$m_{31}$=sin(Phi)

$m_{32}$=sin(Omega) cos(Phi)

$m_{33}$=cos(Omega) cos(Phi)

The application of the above equation to step 2 is difficult because its inverse function must be formed. In order to do this, a first order Taylor series expansion for the variables X, Y, Z, Omega, Phi, and Kappa is written. Estimates of the variables are used in the Taylor expansion and a least squares analysis iterates to improve the solution. For this method to work, at least three reference sensors 30 are required; however, for practical application, at least six sensors should be used. (Six sensors work well because it is best to spread the measurement and encoding errors over more than a minimum set of equations.)

The application of the algorithm to step 3 is straightforward. The position and orientation of projector 20 was computed in step 2, and the known positions for projection are then applied to the equation and the horizontal and vertical angles from the pair of orthogonal galvanometers are computed.

Figure 2:
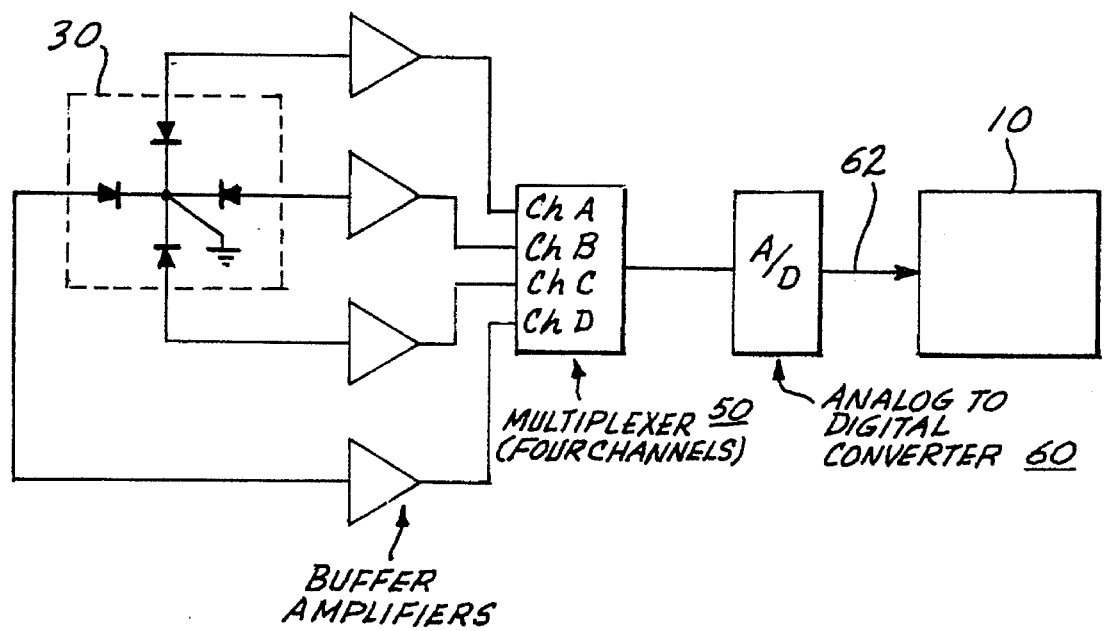

The design of the reference sensors may feature area measuring devices, such as CCD arrays (i.e., area arrays), and quadrant detectors. As such, these devices can be digital, analog, or a combination thereof. FIG. 2 shows an exemplary reference sensors system. The schematic shown in FIG. 2 is for analog sensors 30, which are converted downstream through multiplexer 50 and analog to digital converter 60 to digital signals 62. Algorithms in the computer at controller 10 perform automatic gain control (i.e., computations to reduce reference sensitivity to changes in laser power).

It is required that necessary reference sensors 30 be mounted on object 40 for which the projected pattern is designed. A practical method which can be used for doing this is to mount reference sensors 30 on the tool in a repeatable manner and then measure that location with another measuring system (e.g., computer-aided theodolites).

The locating of reference sensors 30 can be partially automated. The operator will need to manually drive projector 20 to each sensor 30. Once the laser beam strikes the cell, an automated control system overrides the manual motion and drive the projected laser light to the center of the reference sensor. In such an automated system, a rotational transformation algorithm is required because the initial rotation of the sensor with respect to the orientation of the projector is unknown. This simplifies the operation and increases the accuracy.

Distortion compensation (i.e., pin cushion and barrel) should be compensated. Distortion compensation is utilized when computing the angles for projector 20. An inverse function for distortion is utilized when computing the location and orientation of the projector.

A CAD data file or measured data file is utilized to define the X, Y, and Z positions for laser projection. There are many optimal methods which may be utilized when recording this data for use in projecting the ply outline.

These several exemplary methods include:

1. defining a constant velocity path around the circumference of the ply.

2. defining points (e.g., equally spaced) around the periphery of the ply.

3. defining point to simulate eyebrows around the part.

The selected exemplary method being number 3. Such method limits the amount of data which needs to be projected, and thus allows the speed for projection to increase, thereby reducing the apparent laser flicker.

What is claimed is:

1. In combination a laser projector system for projecting a three-dimensional data set onto the contained surface of an object;

a laser projector for projecting an image onto said object, said laser projector having a visible laser source and the capability of steering or pointing said laser thus forming a projection on said object, including two orthogonally mounted galvanometers with a mirror mounted on the galvanometer shafts;

a three-dimensional data set describing the path of the image to be projected on the contained surface of the object;

a plurality of reference sensors located on said object, said plurality of reference sensors located on said object having the same coordinate system as the three-dimensional data set of said projected image, and said reference sensors being positionally located on said object by independent means;

means for measuring the steering angles of said laser from an arbitrary position, including measurement of voltages driving the orthogonally mounted galvanometers and converting the same to angles;

means for steering or pointing the laser beam at the plurality of reference sensors and measuring the horizontal and vertical angles from an arbitrary datum for the positions of said plurality of reference sensors;

computational means for determining the position and orientation of the laser projector with respect to said plurality of reference sensors, given the positional location of said references and given the measured horizontal and vertical angles to the plurality of reference sensors, including use of orthogonal transformation; and, computational means for determining the horizontal and vertical angles with respect to said arbitrary datum, given said three dimensional data set describing the path of the image to be projected on the contained surface of the object, including use of an orthogonal transformation, said horizontal and vertical angles being used to drive said steering or pointing by the laser projector.

2. A laser system recited in claim 1, wherein said reference sensor is a dual axis linear photosensor, including quadrant photocells, for electronically determining the center of reference sensor being impinged by said laser source.

* * * * *